US012784176B2

(12) United States Patent
Mohanur Raghunathan et al.

(10) Patent No.: US 12,784,176 B2
(45) Date of Patent: Nov. 3, 2026

(54) REGISTRATION BETWEEN AN INSPECTION IMAGE AND A DESIGN IMAGE

(71) Applicant: Applied Materials Israel Ltd., Rehovot (IL)

(72) Inventors: Ganesh Kumar Mohanur Raghunathan, Bengaluru (IN); Ubhay Kumar, Bengaluru (IN); Shani Gat, Tel Aviv (IL); Tal Frank, Tel Aviv (IL); Balaji Chithugnanamoorthy, Bangalore (IN); Rafael Bistritzer, Petach-Tikva (IL)

(73) Assignee: Applied Materials Israel Ltd., Rehovot (IL)

( * ) Notice: Subject to any disclaimer, the term of this patent is extended or adjusted under 35 U.S.C. 154(b) by 318 days.

(21) Appl. No.: 18/582,549

(22) Filed: Feb. 20, 2024

(65) Prior Publication Data

US 2025/0265697 A1 Aug. 21, 2025

(51) Int. Cl.

| | |
|---|---|
| ***G06T 7/00*** | (2017.01) |
| ***G06T 5/70*** | (2024.01) |
| ***G06T 7/181*** | (2017.01) |
| ***G06T 7/33*** | (2017.01) |
| ***G06T 7/50*** | (2017.01) |

(52) U.S. Cl.

CPC .............. *G06T 7/0006* (2013.01); *G06T 5/70* (2024.01); *G06T 7/181* (2017.01); *G06T 7/337* (2017.01); *G06T 7/50* (2017.01); *G06T 2207/30148* (2013.01)

(58) Field of Classification Search

CPC ............. G06T 2207/30148; G06T 5/70; G06T 7/0006; G06T 7/001; G06T 7/181; G06T 7/33; G06T 7/337; G06T 7/50

See application file for complete search history.

(56) References Cited

U.S. PATENT DOCUMENTS

| | | | | |
|---|---|---|---|---|
| 2011/0235895 A1* | 9/2011 | Kitamura | ............. | G06V 10/457 382/144 |
| 2018/0012349 A1* | 1/2018 | Sakai | .................... | G06T 7/0004 |
| 2021/0042901 A1* | 2/2021 | Kaneko | .............. | G01N 23/2251 |

OTHER PUBLICATIONS

Klein S., et al., “Elastix: A Toolbox for Intensity Based Medical Image Registration,” IEEE Transactions on Medical Imaging, 2010, vol. 29(1), pp. 196-205.

Kuhl F. P., & Giardina C. R., “Elliptic Fourier Features of a Closed Contour,” Computer Graphics and Image Processing, 1982, vol. 18(3), pp. 236-258.

(Continued)

*Primary Examiner* — Ruiping Li

(74) *Attorney, Agent, or Firm* — Lowenstein Sandler LLP

(57) ABSTRACT

There are provided systems and methods comprising obtaining an inspection image of a semiconductor specimen, and a design image, wherein the design image is informative of design elements, determining data $D_{pitch}$ informative of a periodic distance between design elements of the design image, which are associated with a shape meeting a similarity criterion, and using the data $D_{pitch}$ to obtain registration data between the design image and the inspection image.

19 Claims, 14 Drawing Sheets

(56) References Cited

OTHER PUBLICATIONS

Rueckert D., et al., “Nonrigid Registration Using Free-form Deformations: Application to Breast MR Images,” IEEE Transactions on Medical Imaging, 1999, vol. 18(8), pp. 712-721.
Shamonin D. P., et al., “Fast Parallel Image Registration on CPU and GPU for Diagnostic Classification of Alzheimer’s Disease,” Frontiers in Neuroinformatics, 2014, vol. 11(50), pp. 1-15.
WEB: “Mutual Information,” Wikipedia, Dec. 2, 2023, 10 pages, Retrieved from [https://en.wikipedia.org/wiki/Mutual_information].

* cited by examiner

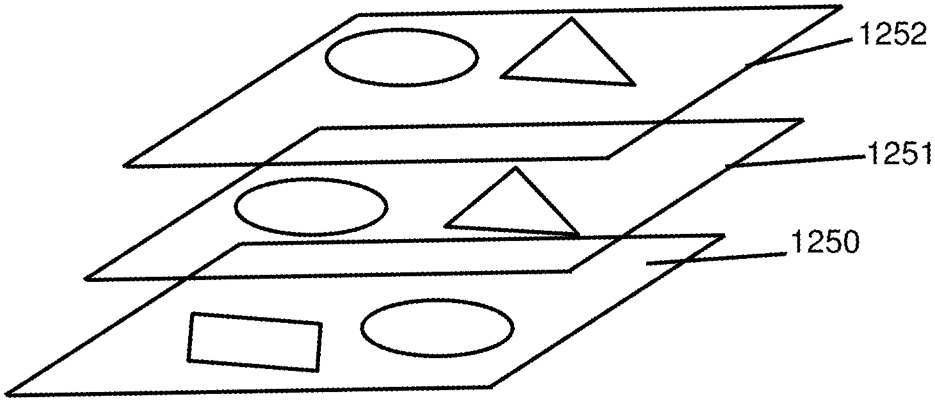

FIG. 12B

1300 Determining shift required for the design image (X axis, Y axis), deformation required for the design image (X axis, Y axis) and displacement parameters for points of the design image

↓

1310 Applying the shift, the deformation and the displacement parameters to the design layer or to each design layer separately

↓

1320 For each given design layer, determining the shift required for the given design layer, the deformation required for the given design layer, and displacement parameters for points of the given design layer

FIG. 13

REGISTRATION BETWEEN AN INSPECTION IMAGE AND A DESIGN IMAGE

TECHNICAL FIELD

The presently disclosed subject matter relates, in general, to the field of examination of a specimen, and more specifically, to automating the examination of a specimen.

BACKGROUND

Current demands for high density and performance associated with ultra large scale integration of fabricated devices require submicron features, increased transistor and circuit speeds, and improved reliability. Such demands require formation of device features with high precision and uniformity, which, in turn, necessitates careful monitoring of the fabrication process, including automated examination of the devices while they are still in the form of semiconductor wafers.

Examination processes are used at various steps during semiconductor fabrication to measure dimensions of the specimens (metrology), and/or to detect and classify defects on specimens (e.g., Automatic Defect Classification (ADC), Automatic Defect Review (ADR), etc.).

GENERAL DESCRIPTION

In accordance with certain aspects of the presently disclosed subject matter, there is provided a system comprising one or more processing circuitries configured to obtain an inspection image of a semiconductor specimen, and a design image or design data, informative of a plurality of design elements, determine data $D_{pitch}$ informative of a periodic distance between design elements of the plurality of design elements, which are associated with a shape meeting a similarity criterion, and use the data $D_{pitch}$ to obtain registration data between the design image or the design data, and the inspection image.

According to some examples, the design image or the design data are informative of a plurality of design layers, wherein the system is configured to determine, for each given design layer of the plurality of design layers, given registration data between the given design layer and the inspection image.

According to some examples, the system is configured to determine a derivative signal corresponding to a derivative of a pixel intensity signal associated with the design image or with the design data, and to use the derivative signal to determine data $D_{pitch}$.

According to some examples, the system is configured to determine a correspondence between the design image and the inspection image, for different shifts of the design image relative to the inspection image, wherein amplitude of the different shifts has been determined based on data $D_{pitch}$.

According to some examples, determining a correspondence between the design image and the inspection image comprises determining mutual information between the design image and the inspection image.

According to some examples, the system is configured to determine a correspondence between the design image and the inspection image, for different successive positions of the design image relative to the inspection image, wherein each position of these successive positions differs from a previous position by a shift which is equal to or smaller than half said periodic distance.

According to some examples, determining a correspondence between the design image and the inspection image comprises determining mutual information between the design image and the inspection image.

According to some examples, the system is configured to determine a correspondence between the design image and the inspection image, for different successive positions of the design image relative to the inspection image, wherein each position of these successive positions differs from a previous position by a shift which is equal to or smaller than half said periodic distance.

According to some examples, the system is configured to determine a correspondence between the design image and the inspection image, for different first successive positions of the design image relative to the inspection image, wherein each position of these first successive positions differs from a previous position by a first shift value, to obtain a first estimate of a registered position of the design image with respect to the inspection image, and determine a correspondence between the design image and the inspection image, for different second successive positions of the design image relative to the inspection image, located around said first estimate of the registered position, wherein each position of these second successive positions differs from a previous position by a second shift value, smaller than the first shift value, to obtain a second estimate of a registered position of the design image with respect to the inspection image.

According to some examples, for at least one given design element of the design elements, the system is configured to convert edges of the given design element into rounded edges, wherein a curvature of the rounded edges is selected based on one or more dimensions of the given design element.

According to some examples, the inspection image comprises a plurality of structural elements, wherein the system is configured to perform at least one of (i) or (ii): (i) perform a reduction of noise present in the inspection image, wherein said reduction depends on one or more dimensions of the structural elements, or (ii) perform an enhancing of edges of one or more of the structural elements, wherein said enhancing depends on one or more dimensions of the structural elements.

According to some examples, the system is configured to detect presence of one or more horizontal or vertical lines in the design image or in the design data, and use this detection to determine the registration data between the design image or the design data and the inspection image.

According to some examples, the registration data comprise data informative of a shift of the design image or of the design data, data informative of a deformation of one or more of the plurality of design elements, and displacement parameters of one or more points of the design image or of the design data.

According to some examples, the system is configured to determine a deformation enabling a match between the design elements and structural elements of the inspection image according to a matching criterion.

According to some examples, the system is configured to determine a grid of points in the design image, determine displacement parameters of a plurality of points of the grid, in order to match the inspection image according to a matching criterion, wherein at least two points of the grid are associated with different displacement parameters, and use the displacement parameters to transform the design image or the design data.

According to some examples, a distance between adjacent points of the grid is equal to or larger than half a minimum distance between the design elements.

According to some examples, the design image or the design data is informative of a plurality of design layers, According to some examples, the registration parameters are informative of at least one of a shift, a deformation, or displacement parameters of one or more points of the design image, wherein the system is configured to use said registration parameters to transform each design layer separately.

According to some examples, the design data is informative of a plurality of design layers, wherein the system is configured to rasterize the design data of the plurality of design layers, and combine them to obtain the design image, without requiring user input for defining pixel intensity in the design image.

In accordance with other aspects of the presently disclosed subject matter, there is provided a method comprising, by one or more processing circuitries, obtaining an inspection image of a semiconductor specimen, and a design image or design data, informative of a plurality of design elements, determining data $D_{pitch}$ informative of a periodic distance between design elements of the plurality of design elements, which are associated with a shape meeting a similarity criterion, and using the data $D_{pitch}$ to obtain registration data between the design image or the design data, and the inspection image.

According to some embodiments, the method can comprise one or more of the features above, described with reference to the system.

In accordance with other aspects of the presently disclosed subject matter, there is provided a non-transitory computer readable medium comprising instructions that, when executed by a computer, cause the computer to perform operations described with reference to the method above.

The proposed solution provides various technical advantages. At least some of them are listed hereinafter.

According to some examples, the proposed solution enables efficient and accurate registration between an inspection image (e.g., SEM image) of a semiconductor specimen and a design image.

According to some examples, the proposed solution enables automatic registration between an inspection image (e.g., SEM image) of a semiconductor specimen and a design image. In some examples, a fully automatic registration is obtained.

According to some examples, the proposed solution enables registration between a multi-layer design image and an inspection image (e.g., SEM image) of a semiconductor specimen.

According to some examples, the proposed solution enables registration of each layer of a multi-layer design image with an inspection image (e.g., SEM image).

According to some examples, the proposed solution does not require manual intervention of a user for matching each polygon of each layer of the design image with an inspection image. To the contrary, the proposed solution automatically determines registration parameters for each polygon of each layer.

According to some examples, the proposed solution does not require user intervention for defining pixel intensity of a design image obtained from design data.

BRIEF DESCRIPTION OF THE DRAWINGS

In order to understand the disclosure and to see how it may be carried out in practice, embodiments will now be described, by way of non-limiting example only, with reference to the accompanying drawings, in which:

FIG. 12B illustrates a non-limitative example of a design image with multiple design layers.

FIG. 13 illustrates a generalized flow-chart of a method of registering, separately, each design layer of a design image with an inspection image.

DETAILED DESCRIPTION OF EMBODIMENTS

Registration between images is required in various applications. In some cases, it can be required to register a design image (e.g., CAD image) with an inspection image (e.g., SEM image) of a semiconductor specimen. In prior art systems, registration between a CAD image and a SEM image required manual intervention of the user, in order to attempt to match, in a manual way, the polygons of the CAD image with the SEM image. New systems and methods are provided hereinafter in the field of image registration, which can be performed automatically (or at least with less intervention of the user). The solution is applicable to multi-layers design images. According to some examples, the solution provides, in an automatic way, optimal transformations of the CAD image (shift, deformation, displacement of points) to match the SEM image. Such registration can be used for various applications, such as, but not limited to, defect detection, monitoring of the manufacturing process, etc. Once registration data between the design image and the inspection image have been determined (which reflect the deviation between the specimen and the intended design), they can be used to modify or improve the manufacturing process.

According to some examples, and as further explained hereinafter, a periodic distance (pitch distance) between repetitive design elements of a design image is determined. A correspondence between the design image and an inspection image, for different shifts of the design image relative to the inspection image, is determined. The amplitude of each shift is determined based on this pitch distance (in some examples, each shift is selected to be equal to or smaller than half the pitch distance). Other processing operations, such as deformation of the design elements and displacement of points of the design elements, can be performed to register automatically the design image with the inspection image.

Figure 1:
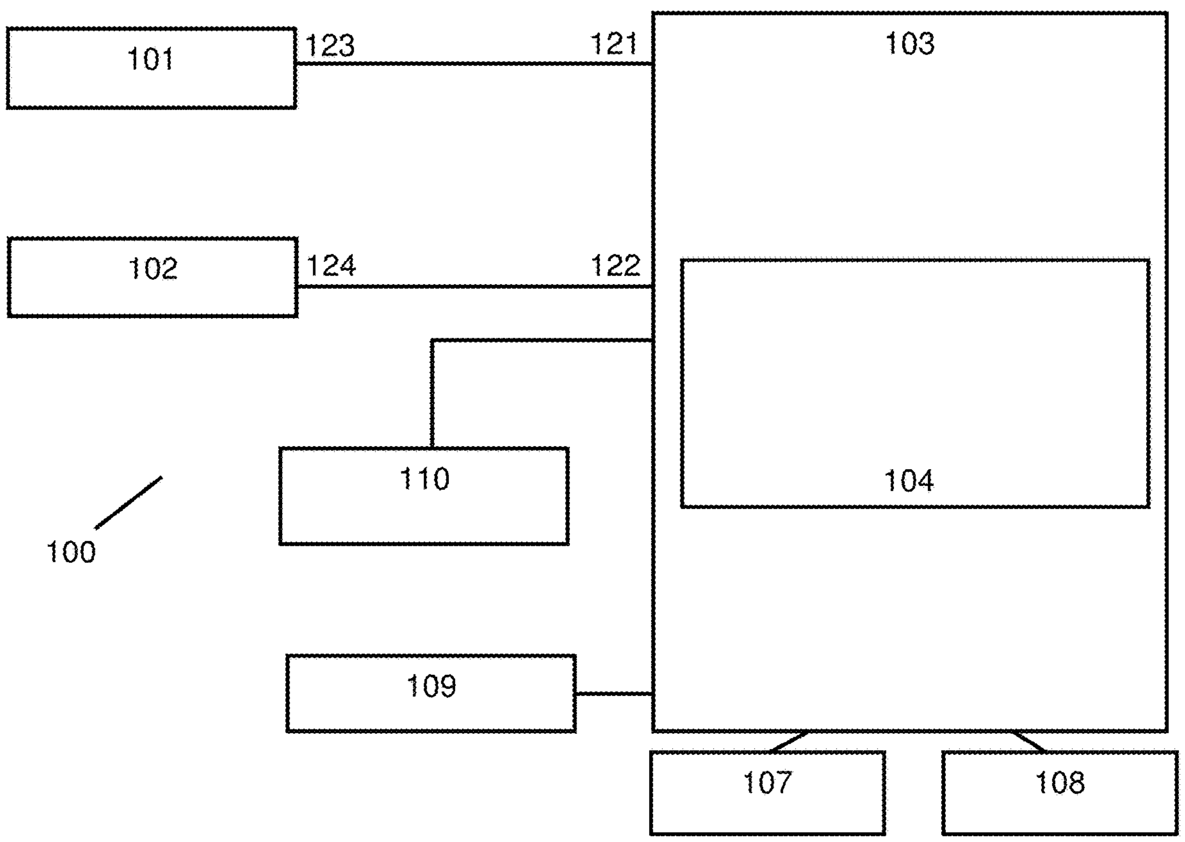
FIG. 1 illustrates a generalized block diagram of an examination system in accordance with certain embodiments of the presently disclosed subject matter.

Attention is drawn to FIG. 1 illustrating a functional block diagram of an examination system in accordance with certain embodiments of the presently disclosed subject matter. The examination system 100 illustrated in FIG. 1 can be used for examination of a specimen (e.g., of a wafer and/or parts thereof) as part of the specimen fabrication process. The illustrated examination system 100 comprises computer-based system 103 capable of automatically determining metrology-related and/or defect-related information using images obtained during specimen fabrication. System 103 can be operatively connected to one or more low-resolution examination tools 101 and/or one or more high-resolution examination tools 102 and/or other examination tools. The examination tools are configured to capture images and/or to review the captured image(s) and/or to enable or provide measurements related to the captured image(s). System 103 can be further operatively connected to CAD server 110 and data repository 109.

System 103 includes a processing circuitry 104, which includes a processor (or a plurality of processors) and a memory (or a plurality of memories). The processing circuitry 104 is configured to provide all processing necessary for operating the system 103 as further detailed hereinafter (see methods described in FIGS. 2, 6A, 7, 8, 9A, 10A, 11A, 12A and 13 which can be performed at least partially by system 103).

System 103 is configured to receive input data. Input data can include data (and/or derivatives thereof and/or metadata associated therewith) produced by the examination tools and/or data produced and/or stored in one or more data repositories 109 and/or in CAD server 110 and/or another relevant data depository. It is noted that input data can include images (e.g., captured images, images derived from the captured images, simulated images, synthetic images, etc.) and associated numeric data (e.g., metadata, hand-crafted attributes, etc.). It is further noted that image data can include data related to a layer of interest and/or to one or more other layers of the specimen.

By way of non-limiting example, a specimen can be examined by one or more low-resolution examination machines 101 (e.g., an optical inspection system, low-resolution SEM, etc.). The resulting data (low-resolution image data 121), informative of low-resolution images of the specimen, can be transmitted-directly or via one or more intermediate systems—to system 103. Alternatively, or additionally, the specimen can be examined by a high-resolution machine 102, such as a scanning electron microscope (SEM) or Atomic Force Microscopy (AFM)). The resulting data (high-resolution image data 122), informative of high-resolution images of the specimen, can be transmitted-directly, or via one or more intermediate systems—to system 103.

It is noted that image data can be received and processed together with metadata (e.g., pixel size, text description of defect type, parameters of image capturing process, etc.) associated therewith.

Upon processing the input data (e.g. low-resolution image data and/or high-resolution image data, together with other data, such as, for example, design data, synthetic data, etc.), system 103 can send instructions 123 and/or 124 to any of the examination tool(s), store the results (such as registration data between an image of a specimen and a design image) in a storage system 107, render the results via a computer-based graphical user interface GUI 108, and/or send the results to an external system.

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and/or hardware.

Without limiting the scope of the disclosure in any way, it should also be noted that the examination tools can be implemented as inspection machines of various types, such as optical imaging machines, electron beam inspection machines, and so on. In some cases, the same examination tool can provide low-resolution image data and high-resolution image data. In some cases, at least one examination tool can have metrology capabilities.

It is noted that the examination system illustrated in FIG. 1 can be implemented in a distributed computing environment, in which the aforementioned functional modules shown in FIG. 1 can be distributed over several local and/or remote devices, and can be linked through a communication network. It is further noted that in other embodiments at least some examination tools 101 and/or 102, data repositories 109, storage system 107 and/or GUI 108 and/or CAD server 110 can be external to the examination system 100 and operate in data communication with system 103. System 103 can be implemented as stand-alone computer(s) to be used in conjunction with the examination tools. Alternatively, the respective functions of the system can, at least partly, be integrated with one or more examination tools.

Figure 2:
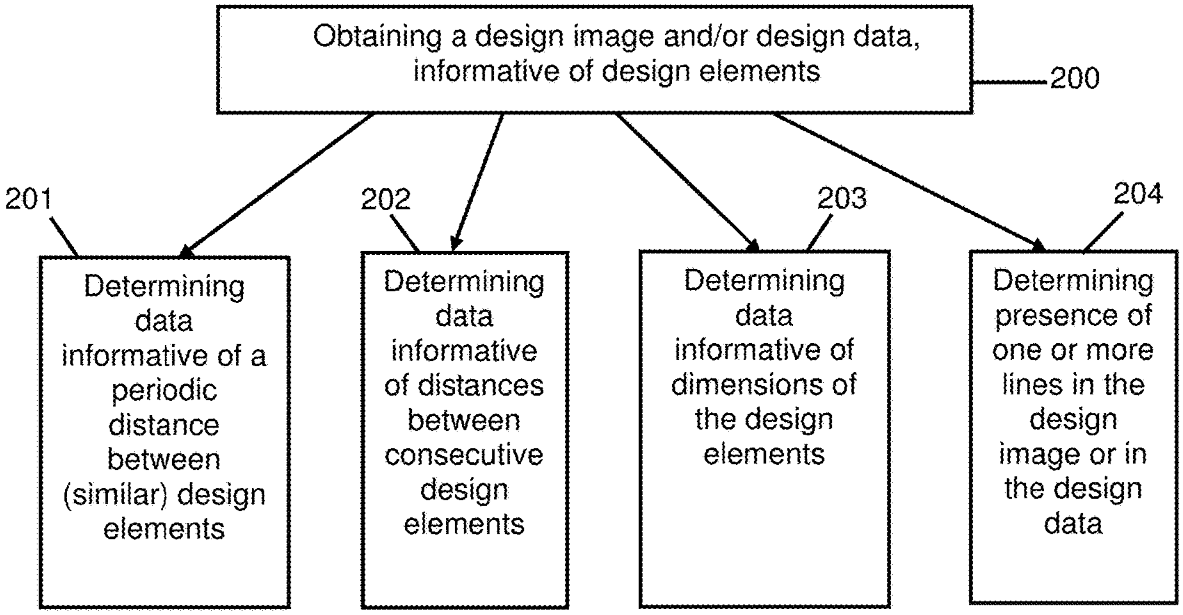
FIG. 2 illustrates a generalized flow-chart of a method of determining geometrical data informative of the design image.

Attention is now drawn to FIG. 2, which describes a method of determining information on a design image and/or on design data, which can be used to register the design image (or the design data) with an inspection image (e.g., SEM image).

The design image includes a plurality of design elements (such as rectangles, triangles, circles, lines) which are informative of real structural elements (e.g., gates, contacts, electrical lines, etc.). The design data is also informative of a plurality of design elements. The design image and the design data are informative of a plurality of design elements. A design element includes one or more geometrical shapes which are informative of the intended design (desired design) of one or more structural elements (e.g., gates, contacts, etc.) of a specimen to be manufactured.

The design image and the design data can be informative of a plurality of design layers. A design layer includes a plurality of design elements and corresponds to the intended design of a real layer of a specimen to be manufactured. In some examples, each design layer of the plurality of design layers is defined by design data (such as CAD data). The design image can correspond to an image obtained, based on the CAD data of the plurality of layers. The design image generally includes pixels (each associated with a pixel intensity), informative of the plurality of design elements, whereas the design data generally includes a plurality of polygons, informative of the plurality of design elements.

The method of FIG. 2 includes obtaining (operation 200) at least one of a design image or design data (e.g., CAD data) usable to generate the design image.

The method of FIG. 2 includes determining various geometrical data informative of the design elements. Note that the method of FIG. 2 can be performed on the design image. In some examples, the design image results from the fusion of design data of a plurality of design layers, after rasterization of the design data of each design layer. In some examples, the method of FIG. 2 can be performed on the design data (CAD data, in which the polygons can be rasterized) of each design layer separately.

According to some examples, the method of FIG. 2 includes determining (operation 201) data ($D_{pitch}$) informative of a periodic distance (also called pitch distance) between design elements of the design image, which are associated with a shape meeting a similarity criterion. In other words, the periodic distance between repeated design elements is determined. This distance is periodic since it is present repetitively between similar design elements of the design image.

Design elements with a shape meeting a similarity criterion can correspond e.g., to a plurality of squares, or to a plurality of triangles, or to a plurality of circles, etc. This is not limitative. The similarity criterion can dictate that the design elements have the same shape (circular, triangular, etc.) and the same size (same radius for a circle, same side length for a triangle, etc.). This is not limitative.

Note that the periodic distance can be computed along one axis (e.g., horizontal X axis of the design image, or vertical Y axis of the design image), or along two axes (e.g., horizontal and vertical axes of the design image). Note that the periodic distance can be different along the horizontal X axis and along the vertical Y axis, or can be the same.

Figure 3A:
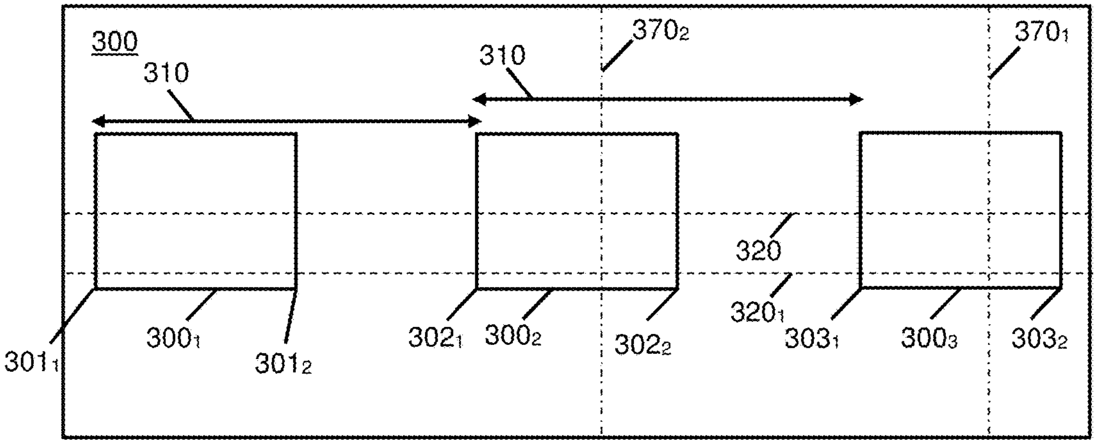
FIG. 3A illustrates a non-limitative example of a design image with repetitive design elements separated by a periodic distance (pitch distance).

A non-limitative example is illustrated in FIG. 3A. Assume that the design image 300 includes a plurality of squares 300$_1$, 300$_2$, 300$_3$. The distance 310 between the first square 300$_1$ and the second square 300$_2$ is equal to the distance 310 between the second square 300$_2$ and the third square 300$_3$. Operation 201 can include determining the value of this periodic distance 310 between similar squares of the design image 300.

In some examples, operation 201 can include determining the derivative of the pixel intensity of the design image along a horizontal axis of the design image (see axis 320 in FIG. 3). Note that this derivative can be determined for each of a plurality of different horizontal axes (see for example axes 320 and 320$_1$), that it to say for different coordinates of the vertical Y axis 307. A plurality of derivative signals is therefore obtained, which can be processed, as explained hereinafter.

Figure 3B:
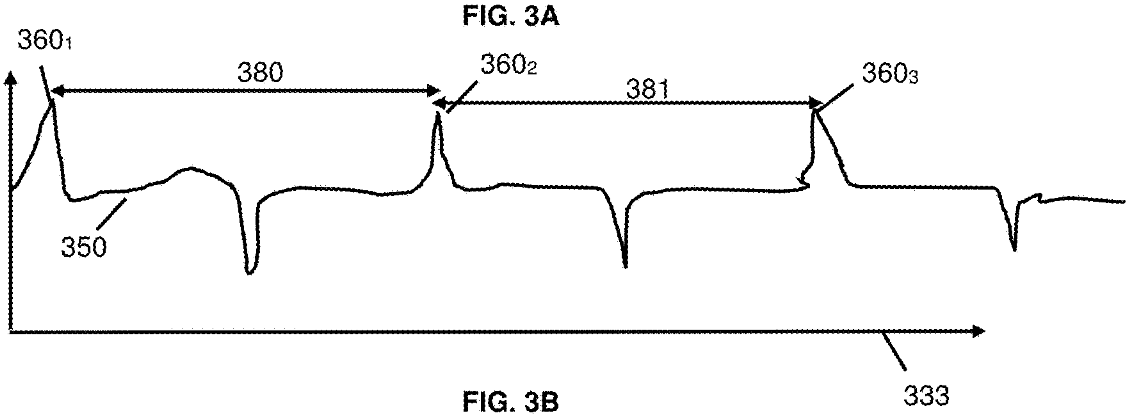
FIG. 3B illustrates a derivative of the pixel intensity of the design image of FIG. 3A, which can be used to determine the periodic distance of the repetitive design elements of FIG. 3A.

A non-limitative example of a derivative signal 350 is illustrated in FIG. 3B. The derivative signal 350 corresponds to the derivative of the pixel intensity of the design image 300 along the horizontal axis 320 (or 320$_1$). As visible in FIG. 3B, the derivative signal 350 includes three main positive peaks 360$_1$, 360$_2$ and 360$_3$. The first positive peak 360$_1$ corresponds to the left side 301$_1$ of the first square 300$_1$, the second positive peak 360$_2$ corresponds to the left side 302$_1$ of the second square 300$_2$ and the third positive peak 360$_3$ corresponds to the left side 3031 of the third square 300$_3$. As also visible in FIG. 3B, the derivative signal 350 includes three main negative peaks 370$_1$, 370$_2$ and 370$_3$. The first negative peak 370$_1$ corresponds to the right side 301$_2$ of the first square 300$_1$, the second negative peak 370$_2$ corresponds to the right side 302$_2$ of the second square 300$_2$, and the third negative peak 370$_3$ corresponds to the right side 302$_3$ of the third square 300$_3$.

According to some examples, the periodic distance 310 can be computed by determining the periodic distance between consecutive positive main peaks along the horizontal axis 333 (see first distance 380 between the first peak 360$_1$ and the second peak 360$_2$, and second distance 381 between the second peak 360$_2$ and the third peak 360$_3$). The periodic distance 310 can correspond, e.g., to the average between the first distance 380 and the second distance 381.

Although FIG. 3A and FIG. 3B depict an example in which the periodic distance is computed along a horizontal axis of the image (parallel to the horizontal X axis 308), the same method can be used to determine the periodic distance along a vertical axis (parallel to the vertical Y axis 307). In particular, the derivative of the pixel intensity can be determined for each of a plurality of vertical axes (see 370$_1$ and 370$_2$), thereby obtaining a plurality of derivative signals. The periodic distance can be computed by determining the periodic distance between consecutive positive main peaks in each of the derivative signals.

In some examples, operation 201 can include determining data informative of a periodic distance between groups of design elements of the design image, wherein the various groups are similar in that each group includes design elements with a shape similar (according to a similarity criterion) to the shape of the design elements of each of the other groups. In particular, each group can include a sequence of design elements distributed along an axis (e.g., X axis, or Y axis), which is similar to the sequence of design elements present in each of the other groups.

Figure 4A:
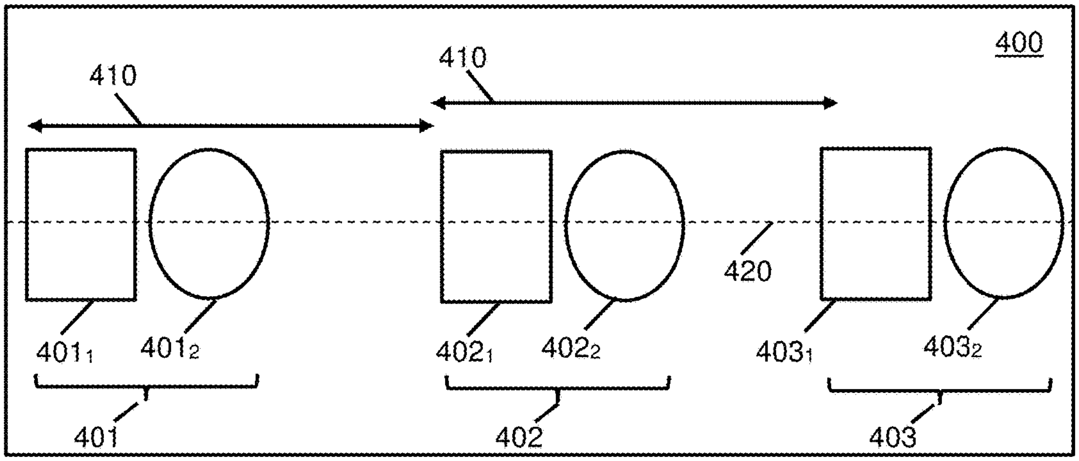
FIG. 4A illustrates a non-limitative example of a design image with repetitive groups of design elements separated by a periodic distance (pitch distance).
Figure 4B:
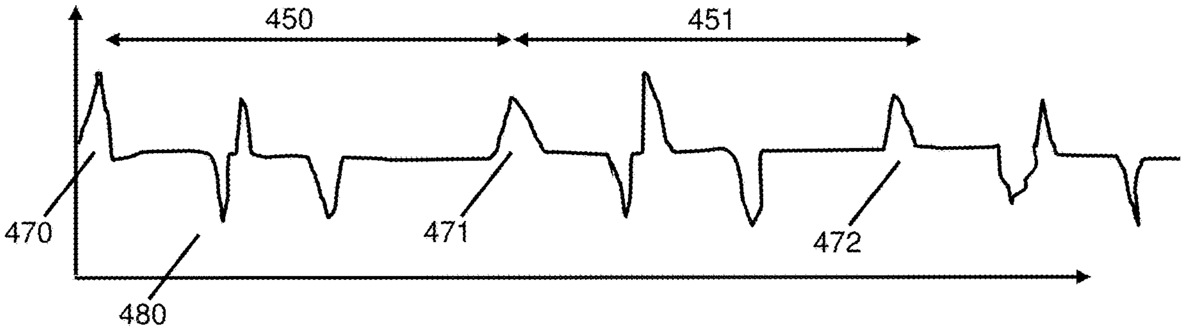
FIG. 4B illustrates a derivative of the pixel intensity of the design image of FIG. 4A, which can be used to determine the periodic distance of the repetitive groups of design elements of FIG. 4A.

A non-limitative example is illustrated in FIG. 4A. In this example, the design image 400 includes a first group 401 of design elements (first square 401$_1$ and first circle 401$_2$), a second group 402 of design elements (second square 402$_1$ and second circle 402$_2$) and a third group 403 of design elements (third square 403$_1$ and second circle 403$_2$). The first, second, and third groups 401, 402, and 403 include design elements which meet a similarity criterion among the different groups.

The periodic distance between the different groups of design elements is noted 410 and corresponds to the distance between the first group 401 of design elements and the second group 402 of design elements, and to the distance between the second group 402 of design elements and the third group 403 of design elements.

In order to compute the periodic distance 410, operation 201 can include determining the derivative 480 of the pixel intensity of the design image 400 along a horizontal axis (X axis) of the design image (see axis 420 in FIG. 4A). As mentioned above, this derivative can be determined for each of a plurality of different horizontal axes, that it to say for different coordinates along the vertical axis. A plurality of derivative signals is therefore obtained, which can be processed, as explained hereinafter.

The signal 480 includes a plurality of positive peaks (corresponding to the respective left sides of the squares, and to the respective extreme left points of the circles present along the horizontal axis 420), and a plurality of negative peaks (corresponding to the respective right edges of the squares, and to the respective extreme right points of the circles present along the horizontal axis 420). Each group (401, 402, 203) of design elements is represented by the same pattern of peaks (the pattern includes a sequence of a positive peak, a negative peak, a positive peak, and a negative peak). The distance between the first positive peak of consecutive groups of design elements corresponds to the periodic distance 410 (see distance 450 which is the distance between the first positive peak 470 of the pattern informative of the first group of design elements and the first positive peak 471 of the pattern informative of the second group of design elements, and distance 451 which is the distance between the first positive peak 471 of the pattern informative of the second group of design elements, and the first positive peak 472 of the pattern informative of the third group of design elements). The periodic distance 410 can correspond, e.g., to the average between the first distance 450 and the second distance 451.

According to some examples, the method of FIG. 2 can include (see operation 202) determining data informative of distances between consecutive design elements (along one axis, such as horizontal X axis or vertical Y axis, or along two axes X and Y). Note that in contrast to operation 201, consecutive design elements can correspond to design elements with a different shape. Operation 202 can include outputting a histogram of distances, from which various data can be computed (average distance between consecutive design elements, minimal or maximal distance between consecutive design elements, variance of the distances, etc.). In some examples, the minimal distance between consecutive design elements is computed for the whole design image (or design data).

According to some examples, operation 202 can be performed by computing the derivative of the pixel intensity (e.g., along the X and/or Y axis) of the design image, and determining the distance between each negative peak (corresponding to the right side or to the extreme right point of a design element) and the next positive peak (corresponding to the left side or to the extreme left point of the next/adjacent design element), although they belong to design elements associated with different shapes. In the vertical axis, this distance corresponds to the distance between the bottom side, bottom edge, or bottom extreme point of a design element, and the top side, or top edge, or top extreme point of the adjacent design element along the vertical axis.

Figure 4C:
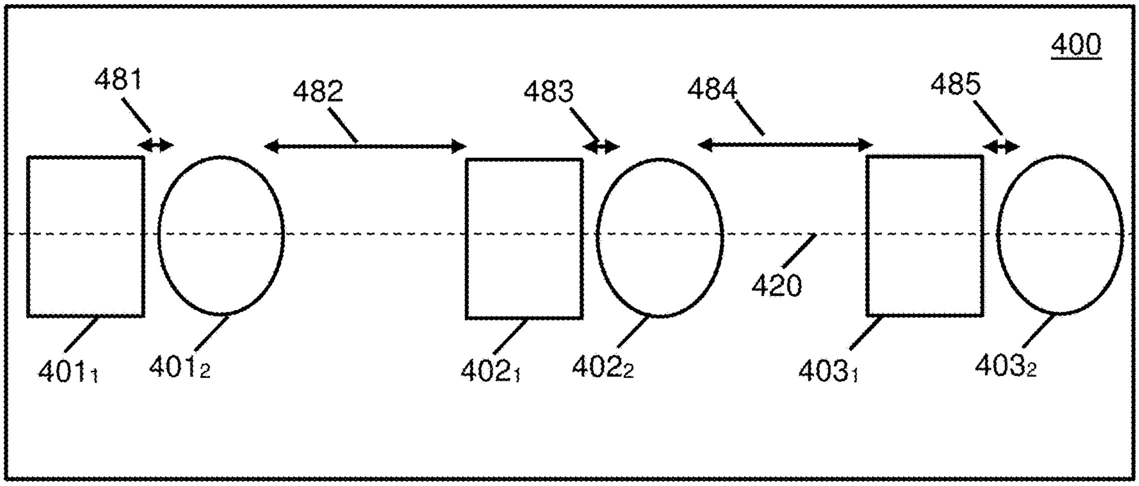
FIG. 4C illustrates a non-limitative example of a design image with a plurality of design elements.
Figure 4D:
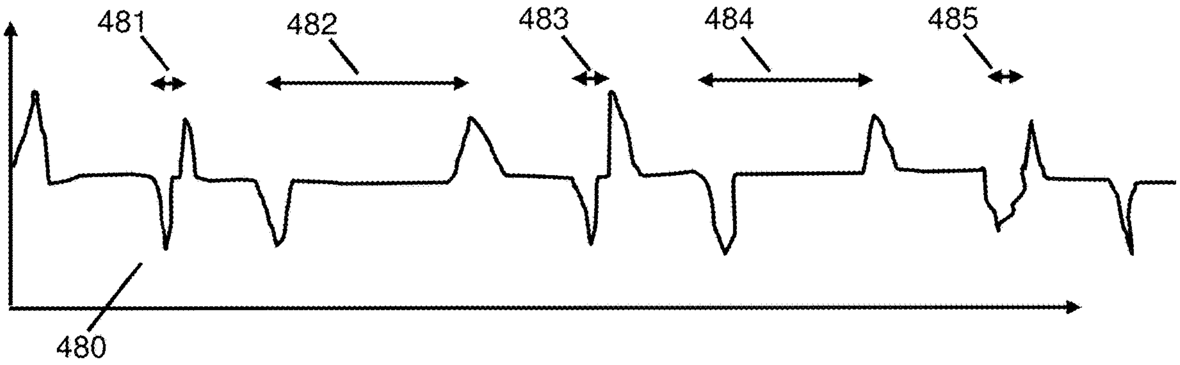
FIG. 4D illustrates a derivative of the pixel intensity of the design image of FIG. 4C, which can be used to determine the distance between adjacent design elements of the design image of FIG. 4C.

In the examples of FIGS. 4C and 4D, the following distances are computed: distance 481 (between the right side of the first square 401$_1$ and the extreme left point of the first circle 401$_2$), distance 482 (between the right side of the first circle 401$_2$ and the extreme left point of the second square 402$_1$), distance 483 (between the right side of the second square 402$_1$ and the extreme left point of the second circle 402$_2$), distance 484 (between the extreme right point of the second circle 402$_2$ and the left side of the third square 403$_1$), and distance 485 (between the right side of the third square 403$_1$ and the extreme left point of the third square 403$_2$).

According to some examples, the method of FIG. 2 can include (see operation 203) determining data informative of dimensions of the design elements (along one axis, e.g., horizontal X or Y axis, or along two axes X and Y of the design image). In some examples, this data can be used to determine the largest width and/or largest height among the design elements. In some examples, this data can be used to determine the smallest width and/or smallest height among the design elements. In some examples, this data can be used to determine the largest critical dimension (CD) and/or the smallest critical dimension (CD) among the design elements.

According to some examples, operation 203 can be performed by computing the derivative of the pixel intensity (e.g., along the X and/or Y axis), and determining the distance between each positive peak and the next negative peak. In the horizontal axis, this distance corresponds to the distance between the left side, or left edge, or left extreme point of a design element and the right side, or right edge, or right extreme point of the same design element. In the vertical axis, this distance corresponds to the distance between top side, or top edge, or top extreme point of a design element and the bottom side, or bottom edge, or bottom extreme point of the same design element.

Figure 4E:
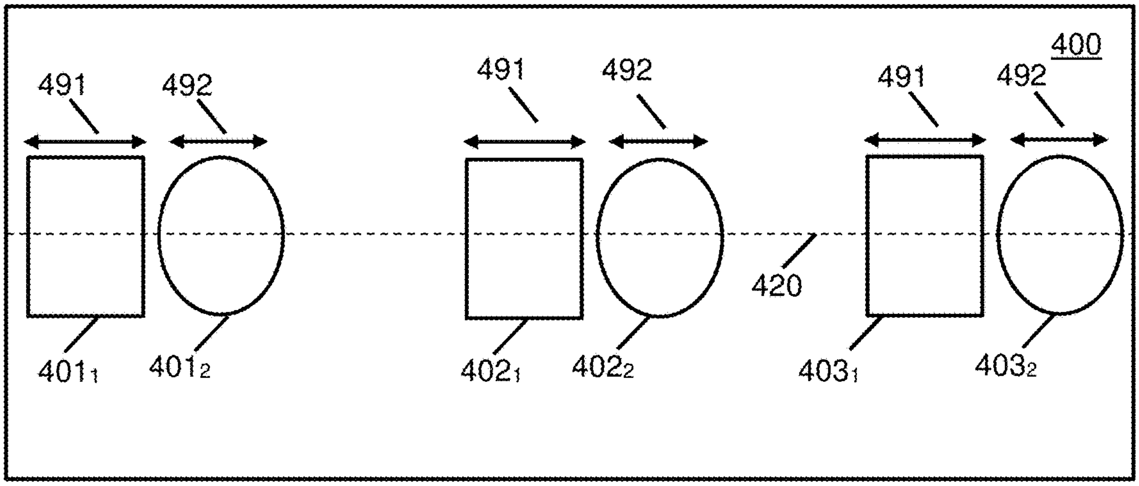
FIG. 4E illustrates a non-limitative example of a design image with a plurality of design elements.
Figure 4F:
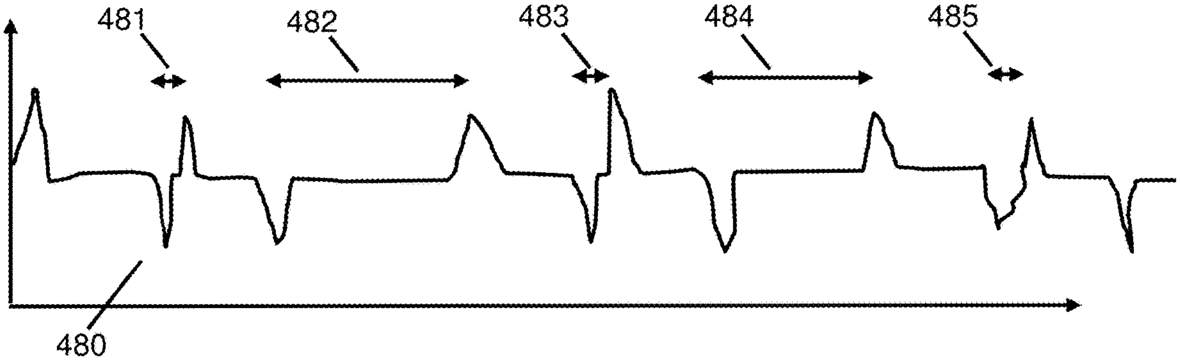
FIG. 4F illustrates a derivative of the pixel intensity of the design image of FIG. 4E, which can be used to determine one or more dimensions of the design elements of FIG. 4E.

In the examples of FIGS. 4E and 4F, the following dimensions are computed: dimension 491 (between the right side of the square 401$_1$ and the left side of the square 401$_1$, or between the right side of the square 402$_1$ and the left side of the square 402$_1$, or between the right side of the square 403$_1$ and the left side of the square 403$_1$) and dimension 492 (between the extreme right point of the circle 401$_2$ and the extreme left point of the circle 401$_1$, or between the extreme right point of the circle 402$_2$ and the extreme left point of the circle 402$_1$, or between the extreme right point of the circle 403$_1$ and the extreme left point of the circle 403$_2$).

According to some examples, the method of FIG. 2 can include (see operation 204) determining the presence of one or more lines in the design image, such as horizontal lines (along the horizontal X axis of the design image) and/or vertical lines (along the vertical Y axis of the design image).

Figure 5:
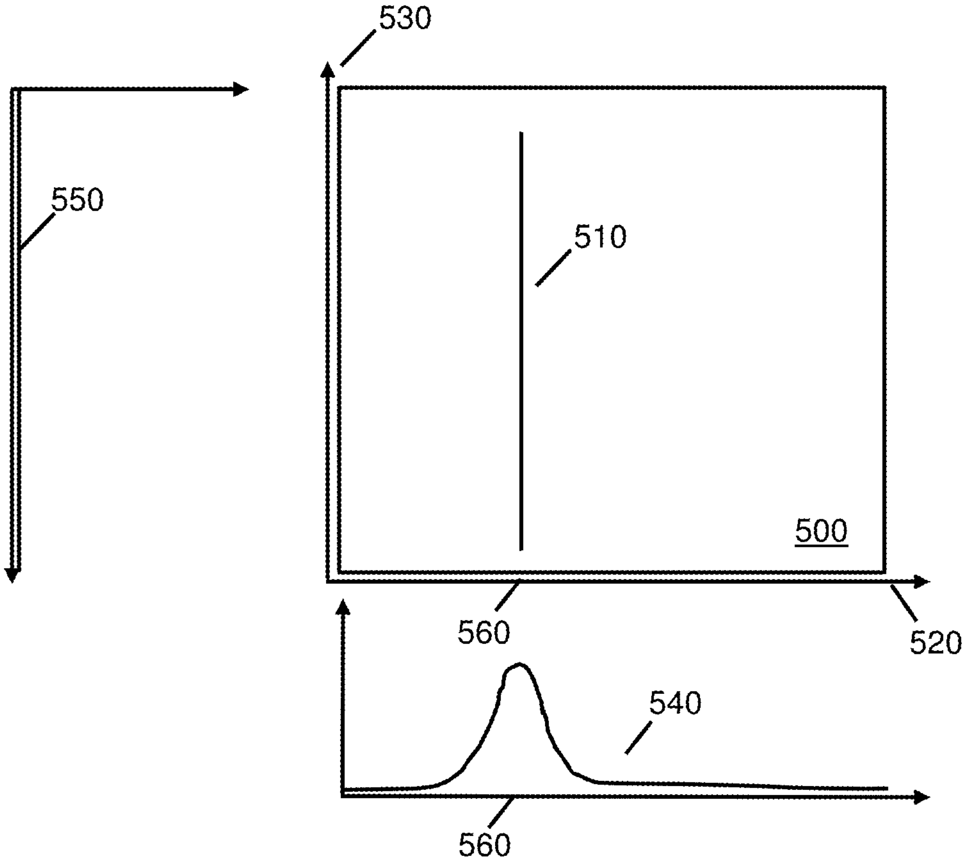
FIG. 5 illustrates a non-limitative example of a method of detecting lines in a design image.

A non-limitative example of operation 204 is illustrated in FIG. 5, in which the design image 500 includes a vertical line 510. In the example of FIG. 5, the derivative 540 of the pixel intensity along the horizontal X axis 520 and the derivative 550 of the pixel intensity along the vertical Y axis 530 are computed. As mentioned above, the derivative can be computed along various horizontal lines of the design image and along various vertical lines of the design image.

It can be seen that at the position 560 along the horizontal axis 520, a peak is present, whereas no peak is present in the derivative signal 550 computed along the vertical axis 530. This indicates the presence of a vertical line at position 560 in the design image. The same principles can be used to detect a horizontal line (for which a peak is present in the derivative computed along the vertical axis, and no peak is present in the derivative computed along the horizontal axis).

In some examples, it is possible to use a clustering algorithm (e.g., K means, trained machine learning model, such as trained deep neural network, or other algorithms) to cluster the design elements, based on their shapes. This can be used to identify the design elements with a similar shape (e.g., squares, triangles, etc.). Once the position of the design elements with a similar shape is known, it is possible to determine the periodic distance between the design elements with the same shape and/or the distance between consecutive/adjacent design elements.

Figure 6A:
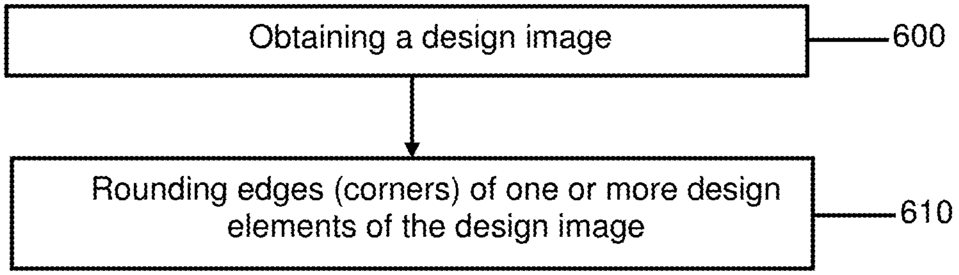
FIG. 6A illustrates a generalized flow-chart of a method of rounding edges of one or more design elements of a design image.

Attention is now drawn to FIG. 6A.

The method of FIG. 6A includes obtaining (operation 600) a design image and/or design data (usable to generate the design image), informative of design elements. The design image and/or the design data can correspond to the design image and design data processed according to the method of FIG. 2.

The method of FIG. 6A further includes rounding (operation 610) edges (that is to say, corners) of one or more design elements. This operation corresponds to a smoothing operation of the edges. The shape and location of the different design elements may have been determined beforehand (using e.g., a clustering algorithm), as explained above with reference to FIG. 2. This shape analysis can therefore be used to determine the edges that need to be rounded at operation 610. Rounding of the edges can include using Elliptic Fourier features of a closed contour.

The method of FIG. 6A can be performed on the design data of each design layer separately (the polygons of each design data may have been rasterized beforehand). In some cases, the method of FIG. 6A can be performed on the design image (which results from the fusion of the design data of the different design layers).

Figure 6B:
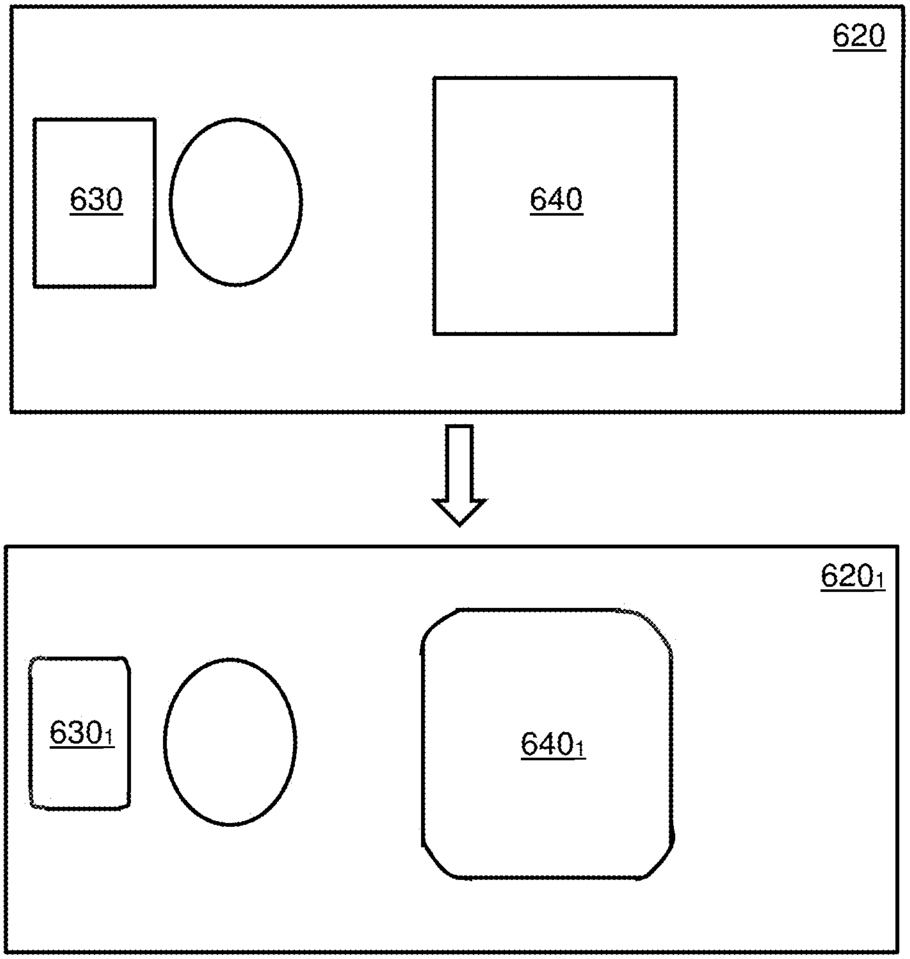
FIG. 6B illustrates a non-limitative example of the method of FIG. 6A.

In some examples, the method of FIG. 6A can further benefit from the processing performed in FIG. 2. As mentioned with respect to operation 203 in FIG. 2, the dimensions of the various design elements (present in the design data or in the design image) can be determined. Rounding of the edges of the design elements can depend on the dimensions of the design elements. In other words, an adaptive edge rounding can be performed. In some examples, the larger the dimensions of a design element, the stronger the rounding applied to its edges (the radius of curvature of the rounded edges is high). Conversely, the smaller the dimensions of a design element, the weaker the rounding applied to its edges (the radius of curvature of the rounded edges is small). This is visible in the non-limitative example of FIG. 6B, in which a design layer 620 includes a first square 630 and a second square 640.

In some examples, the rounding of the edges can depend on the field of view of the inspection image (which has to be registered with the design image). Indeed, by the nature of the lithographic process (the reproducibility of the lithographic process is limited by the wavelength and the size of the structures in the mask), the resultant patterns obtained after the lithographic process correspond to patterns that are smoother versions of the design intent. The amount of rounding of the edges of the patterns depends on the size of the patterns relative to the field of view.

Assume that the number of structures to be measured reminds constant, and that the process technology is changed (corresponding to a shrink of the patterns). Applicant has discovered that the amount of roundedness increases when the size of the pattern shrinks.

The design layer 620 is processed to obtain the modified design layer 6201, in which the edges of the first square 630 have been rounded to obtain the first square 6301, and the edges of the second square 640 have been rounded to obtain the second square 6401. As visible in FIG. 6B, since the dimensions of the second square 640 are larger than the dimensions of the first square 630, the edges of the second square 640 are more rounded than the edges of the first square 630.

Figure 6C:
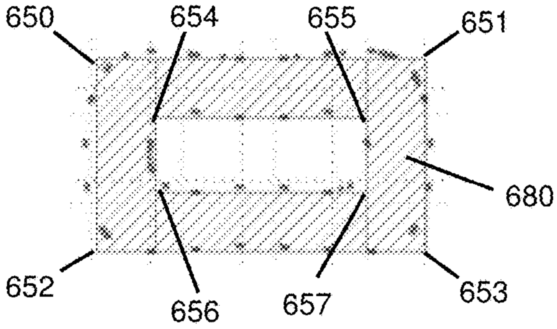
FIG. 6C illustrates another non-limitative example of the method of FIG. 6A.

Note that the edges of the design element which are rounded can correspond to external edges, but can also correspond to internal edges located within the design element. This is illustrated in FIG. 6C, in which four external edges (650, 651, 652 and 653) of the design element 680 are rounded, and four internal edges (654, 655, 656 and 657) of the design element 680 are rounded.

Figure 7:
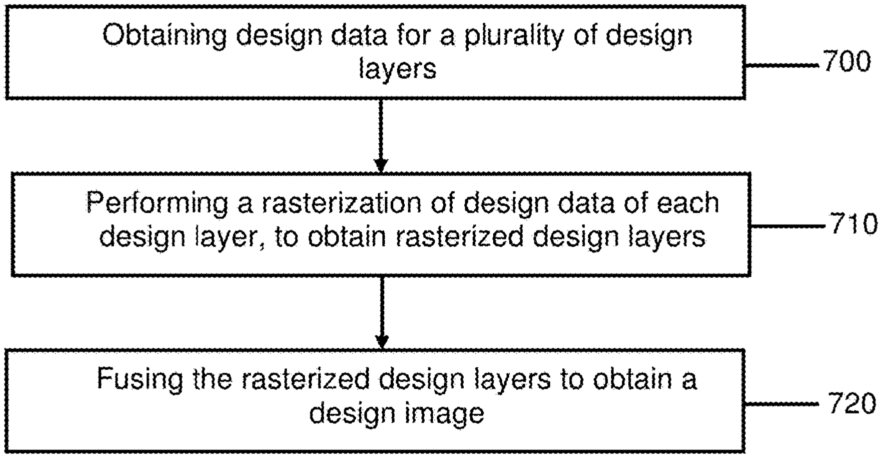
FIG. 7 illustrates a generalized flow-chart of generating a design image.

Attention is now drawn to FIG. 7.

The method of FIG. 7 includes obtaining (operation 700) design data informative of one or more design layers. The design data can correspond to the design data processed according to the method of FIG. 6A, in which the edges of the design elements have been rounded, and to the design data as analyzed according to the method of FIG. 2.

The method of FIG. 7 includes performing (operation 710) a rasterization of the design data of each design layer (this is designated herein as performing a rasterization of each design layer). Rasterization includes taking a vector graphics image which includes shapes, and converting it into a raster image which is made up of pixels. In some examples, all the polygons belonging to the same design layer are assigned with similar pixel values. In some examples, the user input is not required for defining the pixel values of the rasterized layers. This is beneficial since this enables obtaining an automatic method.

The method of FIG. 7 further includes combining (this is also called fusing) the rasterized design layers to obtain a design image. The different rasterized design layers are combined into a common (single) two-dimensional plane in order to obtain the design image.

In some examples, it is possible to assign, in this combination, a respective weight to the pixel intensity of each respective rasterized design layer. For example, the least visible layer(s) (generally corresponding to the deepest layers) get a smaller weight than the most visible layer(s) (generally corresponding to the top layers). As a consequence, the least visible layer(s) gets a pixel intensity value smaller than that of the most visible layer(s).

In a conventional approach, rasterization of design data to obtain a design image requires the user to provide a yield value for each pixel of the different design layers. In other words, a high level of involvement of the user is required. In some examples, the method of FIG. 7 does not require the user to provide the yield value(s), and still enables registration of the design image with an inspection image. In some examples, this property can result from the fact that a specific metric is used hereinafter (mutual information) to determine correspondence between the design image (or design data) and the inspection image, which is insensitive to pixel values. This is however not limitative.

Figure 8:
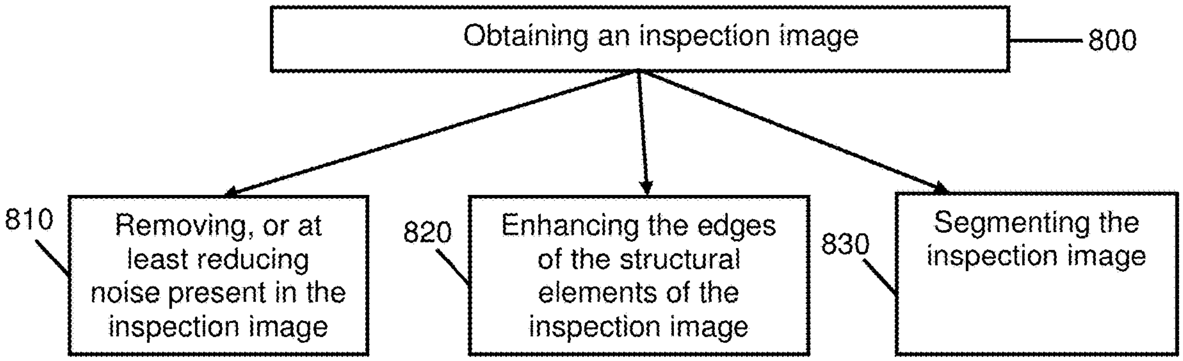
FIG. 8 illustrates a generalized flow-chart of a method of processing an inspection image.

Attention is now drawn to FIG. 8.

The method of FIG. 8 includes obtaining (operation 800) an inspection image acquired by an examination tool (such as examination tool 101 or 102). The inspection image includes a plurality of structural elements (e.g., gates, lines, contacts, etc.). The inspection image is for example a SEM image. As mentioned above, a registration between a design image and the SEM image has to be performed. Various operations performed on the design image and the SEM image are described to enable this registration. This registration can output registration data, which includes different transformations (e.g., shift, deformation, displacement parameters of different points) to be applied to the design image or to the design data to match (as much as possible) the inspection image.

The method of FIG. 8 includes (operation 810) removing, or at least reducing, noise present in the inspection image. This can include using filter(s) to remove noise, such as media filters, wavelet filters, etc. Operation 810 is a denoising operation. This denoising operation can include using the dimension(s) of the design elements, and in particular the critical dimensions(s) (CD) of the design elements, determined using e.g., the method of FIG. 2. In some examples, the minimum of the computed CD and distance between the design elements can be used to design a low pass filter for noise reduction. The inspection images suffer from charging and non-uniform intensity variations. Depending on the field of view, a high pass filter can be designed to eliminate these low frequency noises.

The method of FIG. 8 can also include (operation 820) enhancing the edges of the structural elements of the inspection image. Operation 820 can be performed on the denoised inspection image (after operation 810). In particular, the pixel intensity of the edges of the structural elements can be increased, such as increasing the brilliance/luminosity of the edges. In some examples, selective Gamma correction can be performed on the edges. In some examples, enhancing the edges of the design elements can include using the dimension(s) of the design elements, and in particular the critical dimensions(s) (CD) of the design elements, determined using e.g., the method of FIG. 2. According to some examples, a Morphological Top Hat transform along eight equally spaced directions restores the brilliance of the edges of the structural elements. The structuring element used for the morphological operations can be determined based on the CD of the design elements.

The method of FIG. 8 can also include (operation 830) segmenting the inspection image. Operation 830 can be performed on the inspection image after it has been processed according to operations 810 and 820. In some examples, distance transform is applied on the segmented inspection image.

In some examples, segmentation of the inspection image is performed only when the design image (to be registered with the inspection image) is informative of a single layer, but is not performed when the design image is informative of a plurality of layers.

Figure 9A:
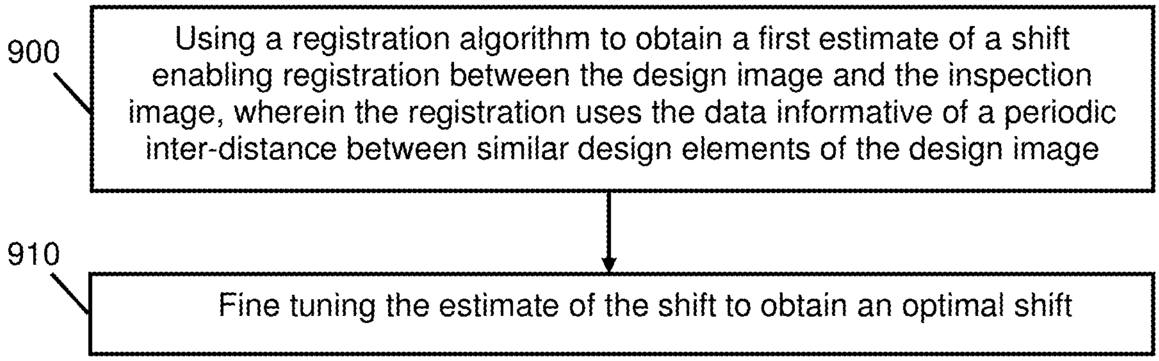
FIG. 9A illustrates a generalized flow-chart of a method of determining a shift between the design image and the inspection image, for registering the design image with the inspection image.
Figure 9B:
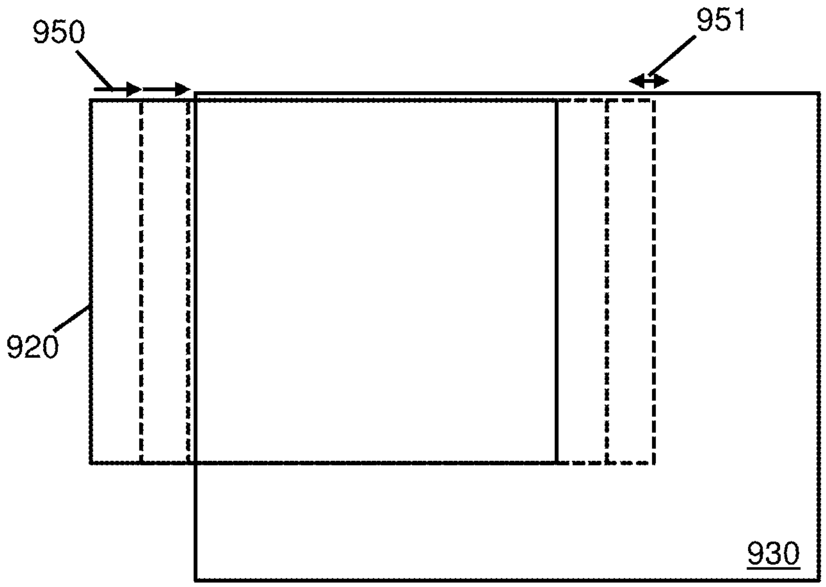
FIG. 9B illustrates a non-limitative example of the method of FIG. 9A.

Attention is now drawn to FIG. 9A and FIG. 9B.

The method of FIG. 9A attempts to find a translation (or shift) enabling registering the design image with the inspection image. To this end, the method of FIG. 9A includes using (operation 900) a registration algorithm to obtain a first estimate of a shift, enabling registration between the design image and the inspection image. The registration algorithm can receive the design image after it has been processed with the various methods described above (see FIG. 2, FIG. 6A and FIG. 7), and the inspection image after it has been processed as described above (see FIG. 8). The registration algorithm can process the design image and the inspection image, as explained hereinafter.

In some examples, operation 900 includes repeatedly shifting the design image 920 relative to the inspection image value 930 (or conversely) by a shift value 950, and, for each relative shift, computing data informative of a match between the design image 920 and the inspection image 930.

In other words, a correspondence between the design image and the inspection image, for different successive positions of the design image relative to the inspection image (note that this includes moving the design image and/or the inspection image to obtain different relative positions), is computed. Each position of these successive positions differs from a previous position by a given shift 950. Note that the relative shift between the design image and the inspection image (in order to find the best match) can be performed, both along the horizontal axis and the vertical axis.

In some examples, for each relative shift (relative position between the design image and the inspection image), mutual information (see e.g. https://en.wikipedia.org/wiki/Mutual_information) is computed between the design image 920 and the inspection image 930. The mutual information indicates the level of correspondence between the design image 920 and the inspection image 930. The relative shift (relative position) for which the correspondence (e.g., mutual information) indicates the best match, corresponds to a first estimate of the shift, enabling a registration of the design image with the inspection image.

In some examples, the shift value (see 950), used by the registration algorithm to test different relative positions between the design image and the inspection image, is selected in an interval between the smallest critical dimension (smallest CD) among the design elements of the design image, and half the periodic distance (also called pitch distance) between similar design elements of the design image. Note that the smallest CD and the pitch distance may have been computed using the method of FIG. 2.

In some examples, the shift value used by the registration algorithm to test different relative positions between the design image and the inspection image, can be different along the horizontal axis than from the vertical axis.

In some examples, the first estimate of the shift between the design image and the inspection image can be fine-tuned (operation 910), in order to improve the correspondence between the design image and the inspection image. In particular, at operation 910, the relative shift 951 (between the design image and the inspection image) can be selected to be smaller than the shift 950 used at operation 900. In some examples, the relative shift 951 can correspond to a pixel or sub-pixel shift (this is not limitative).

Operation 910 enables obtaining an optimal shift, which corresponds to the translation required to make (as much as possible) the design image match the inspection image. Operation 910 can include using a gradient descent algorithm (such as a stochastic gradient descent algorithm) to determine the optimal shift.

The design image can be displaced according to the optimal shift, and then the registration process can be further pursued, as explained hereinafter.

Figure 10A:
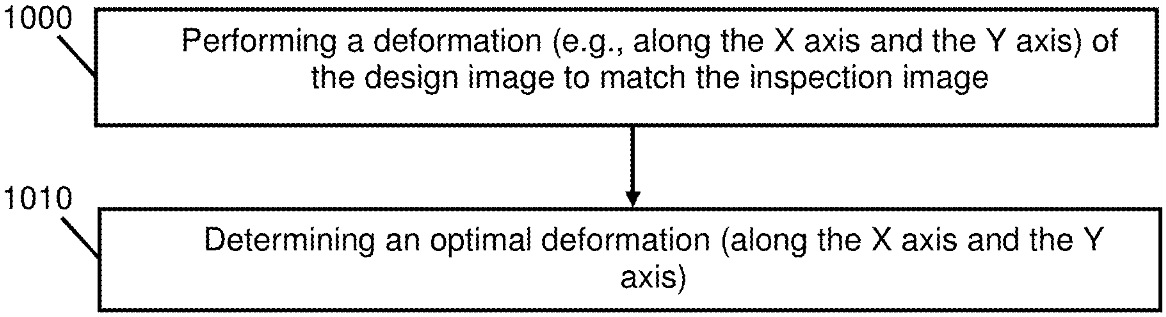
FIG. 10A illustrates a generalized flow-chart of a method of determining a deformation between the design image and the inspection image, for registering the design image with the inspection image.

Attention is now drawn to FIG. 10A.

Once the optimal shift has been determined (as explained, e.g., with reference to FIG. 9A), the registration process can include determining (operation 1000) a deformation of the design image (or of each of the design layers) in order to match the inspection image according to a matching criterion. The matching criterion can define a level of match that is required, or can indicate that the deformed design elements must match the inspection image as much as possible. Note that the deformation can correspond to an expansion of the elements of the design image, or to a shrink of the elements of the design image.

The deformation can include dilating the elements of the design image along a horizontal axis (X axis) of the design image according to a first deformation factor $F_X$ and dilating the elements of the design image along a vertical axis (Y axis) of the design image according to a second deformation factor $F_Y$ (which can be different from the first deformation factor $F_X$). Note that the same first deformation factor $F_X$ can be applied to all design elements along the horizontal axis, and the same second deformation factor $F_Y$ can be applied to all design elements along the vertical axis.

The method of FIG. 10A can include, for each candidate deformation factor, computing data informative of a match between the design image and the inspection image. In some examples, this data corresponds to mutual information. Several values of the candidate deformation factor can be tested, until an optimal deformation factor (for which the mutual information, or other correlation value, indicate the best match) is found (operation 1010). In some examples, a user provides a first estimate of the deformation factor, and the algorithm tests several values around this first estimate, in order to obtain an optimal deformation factor (along the horizontal axis and along the vertical axis). Indeed, the user generally knows the range of process window (range of possible errors in the process), which can be used as a starting point to find the optimal deformation factor.

Figure 10B:
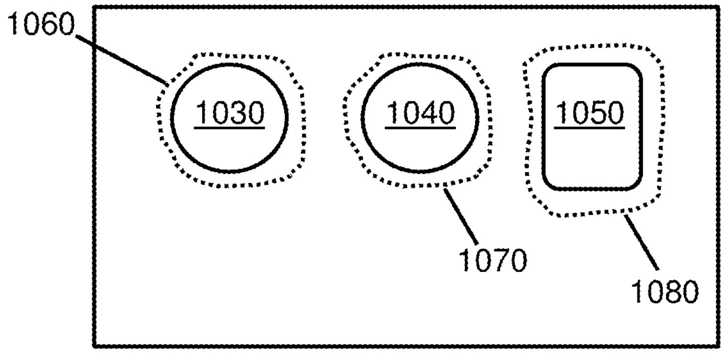
FIGS. 10B and 10C illustrate non-limitative examples of the method of FIG. 10A.
Figure 10C:
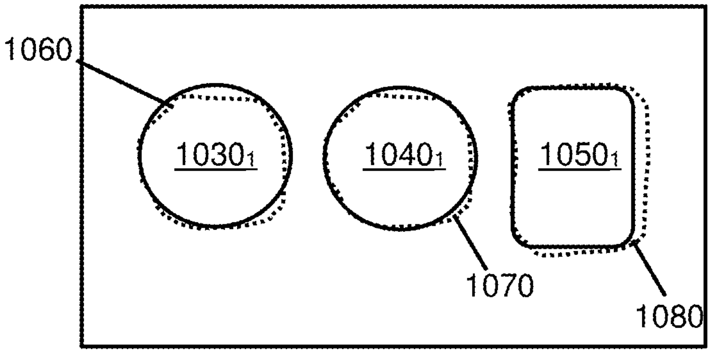

A non-limitative example of FIG. 10A is illustrated in FIGS. 10B and 10C, in which the design elements 1030, 1040, and 1050 are expanded into the design elements $\mathbf{1030}_1$, $\mathbf{1040}_1$, and $\mathbf{1050}_1$, in order to better match the structural elements 1060, 1070, and 1080.

Figure 11A:
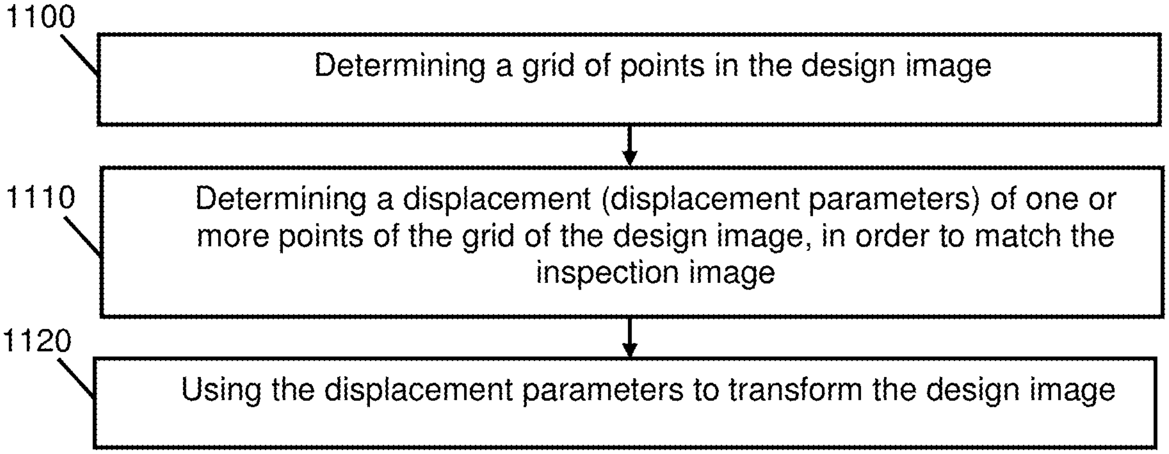
FIG. 11A illustrates a generalized flow-chart of a method of determining a deformable registration between the design image and the inspection image.
Figure 11B:
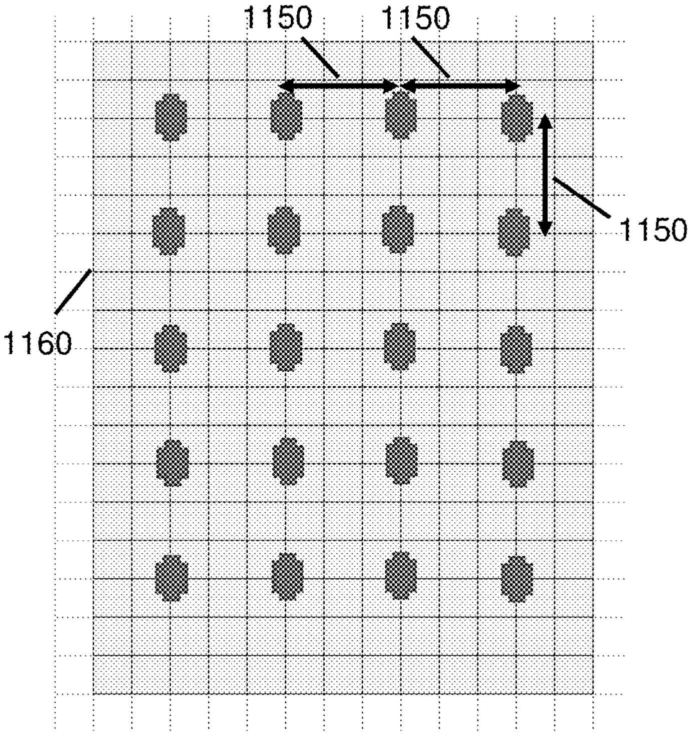
FIGS. 11B and 11C illustrate non-limitative examples of the method of FIG. 11A.
Figure 11C:
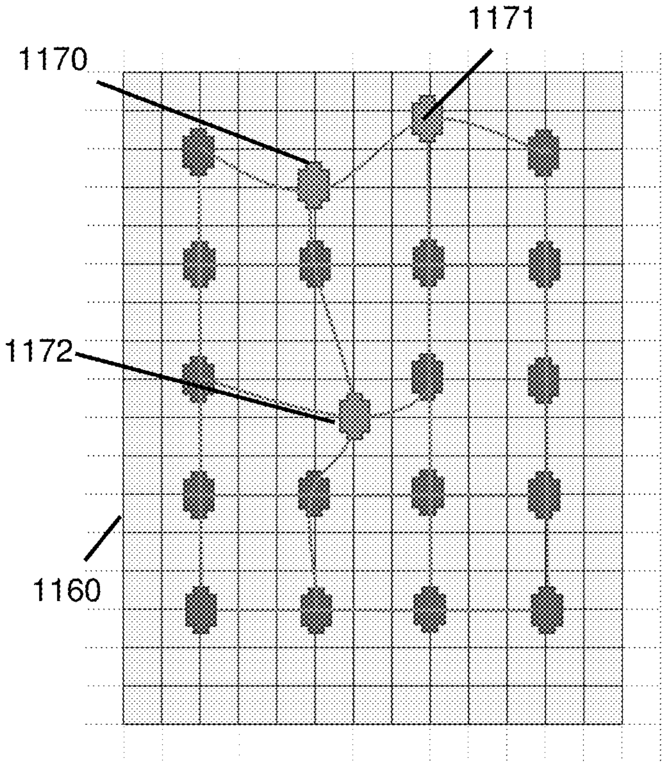

Attention is now drawn to FIGS. 11A and 11B.

Once the design image has been processed as explained above (shift applied to the design image and deformation applied to the design image), it can be processed, as explained with reference to FIG. 11A.

The method of FIG. 11A includes determining (operation 1100) a grid 1160 of points in the design image. According to some examples, this grid 1160 of points is such that the distance 1150 between the points of the grid is equal to or larger than half the minimum distance between design elements in the design image. As explained with reference to operation 202 in FIG. 2, the distance between the various adjacent design elements can be computed. The minimum value of this distance can be used to determine the minimum distance between the points of the grid.

The distance between the points of the grid along the horizontal axis is generally selected as constant, but this is not limitative. Similarly, the distance between the points of the grid along the vertical axis is generally selected as constant, but this is not limitative. The distance between the points of the grid along the horizontal axis is not necessarily equal to the distance between the points of the grid along the vertical axis.

The maximal value of the distance between the points of the grid can be selected to obtain a sufficient number of points along the horizontal axis and along the vertical axis. In some examples, the sufficient number of points corresponds to three points along the horizontal axis and three points along the vertical axis. This is however not limitative.

The method of FIG. 11A further includes determining (operation 1110) a displacement (designated as displacement parameters) of one or more points of the grid of the design image, in order to match the inspection image according to a matching criterion. The matching criterion can define a level of match that is required, or can indicate that the points (after their displacement) must match the inspection image as much as possible. Note that each point can be displaced with a different displacement. The displacement parameters can include, for each point, the displacement required along the horizontal axis and the displacement required along the vertical axis. A non-limitative example is illustrated in FIG. 11B, in which three points 1170, 1171, and 1172 of the grid 1160 of points have been displaced.

In some examples, operation 1110 corresponds to a deformable registration. In some examples, the method described in Rueckert et al., "*Nonrigid registration using free-form deformations: application to breast MR images*", IEEE Journals & Magazine, IEEE Xplore, can be used at operation 1110.

Once the displacement parameters of each point of the grid have been determined, the values of the displacement parameters of the other points of the design image (which do not belong to the grid and are located between the points of the grid) can be determined by using an interpolation method. The method of FIG. 11A further includes applying (operation 1120) the displacement parameters to the points of the design image, to transform the design image. In some examples, the method of FIG. 11A can be performed for each design layer independently. A grid of points is defined for each design layer, and displacement parameters are computed for each point of the grid. Each design layer is then transformed using the displacement parameters.

It has been mentioned above (see operation 204 in FIG. 2) that the presence of one or more horizontal lines and/or vertical lines in the design image or in the design data can be determined. This information can be used to define the grid of points 1160. Indeed, if a horizontal line or a vertical line is present, it is not necessary to place a lot of points of the grid along it.

In some examples, the shift, deformation, and displacement parameters which have been determined can be output using an output device (such as a screen).

Figure 12A:
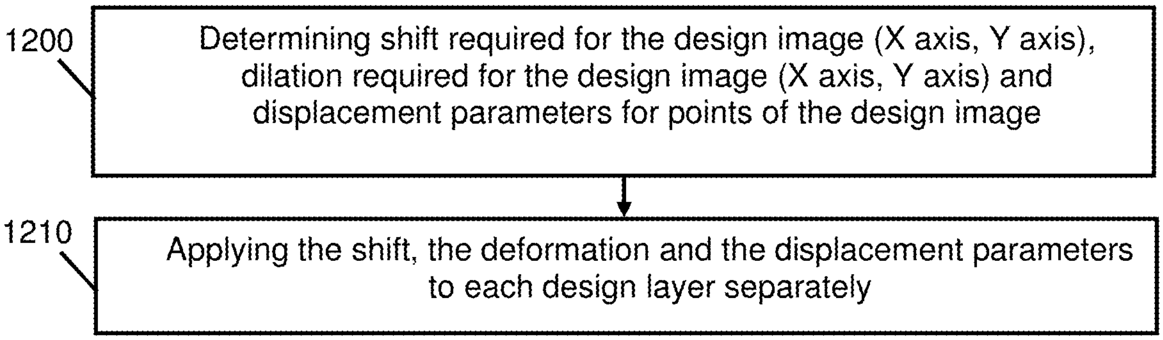
FIG. 12A illustrates a generalized flow-chart of a method of transforming each design layer of a design image separately.

Attention is now drawn to FIGS. 12A and 12B.

In some examples, the design image results from the fusion of a plurality of design layers (CAD layers after rasterization). This is visible in FIG. 12B which illustrates three design layers 1250, 1251, and 1252. Each design layer includes its own design elements.

Once the shift required for the design image (X axis, Y axis) has been determined (as explained with reference to FIG. 9A), the deformation required for the design image (X axis, Y axis) has been determined (as explained with reference to FIG. 10A), and displacement parameters have been determined for points of the design image (as explained with reference to FIG. 11A), it is possible to apply (operation 1210) the shift, deformation, and displacement parameters to each design layer (see layers 1250, 1251, and 1252) separately. Then, a new design image can be recomputed, by fusing the different modified design layers.

Attention is now drawn to FIG. 13, which describes an iterative process of registration between a design image or design (informative of a plurality of design layers) and an inspection image.

Operation 1300 includes determining the shift required for the design image (X axis, Y axis, as explained with reference to FIG. 9A), determining the deformation required for the design image (X axis, Y axis, as explained with reference to FIG. 10A), and determining displacement parameters for points of the design image (as explained with reference to FIG. 11A).

The method of FIG. 13 further includes applying (operation 1310) the shift, deformation, and displacement parameters to the design image, or to each design layer separately.

The process can be repeated iteratively, for each design layer separately. This is shown at operation 1320. For each given design layer, the method includes determining the shift required for the given design layer (X axis, Y axis, as explained with reference to FIG. 9A). Note that since a first estimate of the required shift for the design image has already been determined at operation 1300, it is sufficient to perform a search for the optimal shift of each given design layer on a small scale, such as at pixel level. In other words, it is sufficient to perform, for each given design layer, operation 910 of FIG. 9A (fine tuning of the shift), without being required to perform operation 900 (global estimate of the shift). At operation 1320, the method further includes, for each given design layer, determining the deformation required for the given design layer (X axis, Y axis, as explained with reference to FIG. 10A). At operation 1320, the method further includes, for each given design layer, defining a grid of points in the design layer and determining displacement parameters for points of the grid of the design layer (as explained with reference to FIG. 11A). In other words, registration data (including translation data, deformation data, and displacement parameters of various points) between each design layer and the inspection image can be obtained.

The registration data can be used for various purposes, such as (but not limited to), determining overlay information of the specimen present in the inspection image.

In the detailed description, numerous specific details have been set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the aforementioned discussions, it is appreciated that throughout the specification discussions utilizing terms such as "obtaining", "applying", "determining", "performing", "using", "increasing", "reducing", "estimating", or the like, refer to the action(s) and/or process(es) of a computer that manipulate and/or transform data into other data, said data represented as physical, such as electronic, quantities and/or said data representing the physical objects.

The terms "computer" or "computer-based system" should be expansively construed to include any kind of hardware-based electronic device with a data processing circuitry (e.g., digital signal processor (DSP), a GPU, a TPU, a field programmable gate array (FPGA), an application specific integrated circuit (ASIC), microcontroller, microprocessor etc.), including, by way of non-limiting example, the computer-based system 103 of FIG. 1 and respective parts thereof disclosed in the present application. The data processing circuitry (designated also as processing circuitry—see e.g., processing circuitry 104) can comprise, for example, one or more processors operatively connected to computer memory, loaded with executable instructions for executing operations, as further described below. The data processing circuitry encompasses a single processor or multiple processors, which may be located in the same geographical zone, or may, at least partially, be located in different zones, and may be able to communicate together. The one or more processors can represent one or more general-purpose processing devices such as a microprocessor, a central processing unit, or the like. More particularly, a given processor may be one of: a complex instruction set computing (CISC) microprocessor, a reduced instruction set computing (RISC) microprocessor, a very long instruction word (VLIW) microprocessor, a processor implementing other instruction sets, or a processor implementing a combination of instruction sets. The one or more processors may also be one or more special-purpose processing devices, such as an application specific integrated circuit (ASIC), a field programmable gate array (FPGA), a digital signal processor (DSP), a network processor, or the like. The one or more processors are configured to execute instructions for performing the operations and steps discussed herein.

The memories referred to herein can comprise one or more of the following: internal memory, such as, e.g., processor registers and cache, etc., main memory such as, e.g., read-only memory (ROM), flash memory, dynamic random access memory (DRAM) such as synchronous DRAM (SDRAM) or Rambus DRAM (RDRAM), etc.

The terms "non-transitory memory" and "non-transitory storage medium" used herein should be expansively construed to cover any volatile or non-volatile computer memory suitable to the presently disclosed subject matter. The terms should be taken to include a single medium or multiple media (e.g., a centralized or distributed database, and/or associated caches and servers) that store the one or more sets of instructions. The terms shall also be taken to include any medium that is capable of storing or encoding a set of instructions for execution by the computer and that cause the computer to perform any one or more of the methodologies of the present disclosure. The terms shall accordingly be taken to include, but not be limited to, a read only memory ("ROM"), random access memory ("RAM"), magnetic disk storage media, optical storage media, flash memory devices, etc.

It is to be noted that while the present disclosure refers to the processing circuitry 104 being configured to perform various functionalities and/or operations, the functionalities/operations can be performed by the one or more processors of the processing circuitry 104 in various ways. By way of example, the operations described hereinafter can be performed by a specific processor, or by a combination of processors. The operations described hereinafter can thus be performed by respective processors (or processor combinations) in the processing circuitry 104, while, optionally, at least some of these operations may be performed by the same processor. The present disclosure should not be limited to be construed as one single processor always performing all the operations.

The term "specimen" used in this specification should be expansively construed to cover any kind of wafer, masks, and other structures, combinations and/or parts thereof used for manufacturing semiconductor integrated circuits, magnetic heads, flat panel displays, and other semiconductor-fabricated articles.

The term "examination" used in this specification should be expansively construed to cover any kind of metrology-related operations, as well as operations related to detection and/or classification of defects in a specimen during its fabrication. Examination is provided by using non-destructive examination tools during or after manufacture of the specimen to be examined. By way of non-limiting example, the examination process can include runtime scanning (in a single or in multiple scans), sampling, reviewing, measuring, classifying, and/or other operations provided with regard to the specimen or parts thereof, using the same or different inspection tools. Likewise, examination can be provided prior to manufacture of the specimen to be examined, and can include, for example, generating an examination recipe(s) and/or other setup operations. It is noted that, unless specifically stated otherwise, the term "examination", or its derivatives used in this specification, is not limited with respect to resolution or size of an inspection area. A variety of non-destructive examination tools includes, by way of non-limiting example, scanning electron microscopes, atomic force microscopes, optical inspection tools, etc.

By way of non-limiting example, run-time examination can employ a two-phase procedure, e.g., inspection of a specimen followed by review of sampled locations of potential defects. During the first phase, the surface of a specimen is inspected at high-speed and relatively low-resolution. In the first phase, a defect map is produced to show suspected locations on the specimen having high probability of a defect. During the second phase, at least some of the suspected locations are more thoroughly analyzed with relatively high resolution. In some cases, both phases can be implemented by the same inspection tool, and, in some other cases, these two phases are implemented by different inspection tools.

The term "defect" used in this specification should be expansively construed to cover any kind of abnormality or undesirable feature formed on or within a specimen.

The term "design data" used in the specification should be expansively construed to cover any data indicative of hierarchical physical design (layout) of a specimen. Design data can be provided by a respective designer and/or can be derived from the physical design (e.g., through complex simulation, simple geometric and Boolean operations, etc.). Design data can be provided in different formats such as, by way of non-limiting examples, GDSII format, OASIS format, etc. Design data can be presented in vector format, grayscale intensity image format, or otherwise.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

In embodiments of the presently disclosed subject matter, fewer, more, and/or different stages than those shown in the methods of in FIGS. 2, 6A, 7, 8, 9A, 10A, 11A, 12A and 13 may be executed. In embodiments of the presently disclosed subject matter, one or more stages illustrated in the methods of in FIGS. 2, 6A, 7, 8, 9A, 10A, 11A, 12A, and 13 may be executed in a different order, and/or one or more groups of stages may be executed simultaneously.

It is to be understood that the invention is not limited in its application to the details set forth in the description contained herein or illustrated in the drawings.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

What is claimed is:

1. A system comprising one or more processing circuitries configured to:

obtain an inspection image of a semiconductor specimen, and a design image or design data, informative of a plurality of design elements, determine data $D_{pitch}$ informative of a periodic distance between design elements of the plurality of design elements, which are associated with a shape meeting a similarity criterion, use the data $D_{pitch}$ to obtain registration data between the design image or the design data, and the inspection image, determine a grid of points in the design image, and determine displacement parameters of a plurality of points of the grid, in order to match at least partially the inspection image, wherein at least two points of the grid are associated with different displacement parameters, wherein the registration data and the displacement parameters characterize a transformation between the design image or the design data and the inspection image, the transformation being indicative of deviations between structural elements of the semiconductor specimen represented in the inspection image and corresponding design elements of the design image or design data.

2. The system of claim 1, wherein the design image or the design data are informative of a plurality of design layers, wherein the system is configured to determine, for each given design layer of the plurality of design layers, given registration data between the given design layer and the inspection image.

3. The system of claim 1, configured to determine a derivative signal corresponding to a derivative of a pixel intensity signal associated with the design image or with the design data, and to use the derivative signal to determine data $D_{pitch}$.

4. The system of claim 1, configured to determine a correspondence between the design image or the design data and the inspection image, for different shifts of the design image relative to the inspection image, wherein amplitude of the different shifts has been determined based on data $D_{pitch}$.

5. The system of claim 4, wherein determining a correspondence between the design image or the design data and the inspection image comprises determining mutual information between the design image and the inspection image.

6. The system of claim 1, configured to determine a correspondence between the design image or the design data and the inspection image, for different successive positions of the design image or the design data relative to the inspection image, wherein each position of these successive positions differs from a previous position by a shift which is equal to or smaller than half said periodic distance.

7. The system of claim 1, configured to:

determine a correspondence between the design image or the design data and the inspection image, for different first successive positions of the design image or the design data relative to the inspection image, wherein each position of these first successive positions differs from a previous position by a first shift value, to obtain a first estimate of a registered position of the design image or the design data with respect to the inspection image, and determine a correspondence between the design image or the design data and the inspection image, for different second successive positions of the design image or the design data relative to the inspection image, located around said first estimate of the registered position, wherein each position of these second successive positions differs from a previous position by a second shift value, smaller than the first shift value, to obtain a second estimate of a registered position of the design image or the design data with respect to the inspection image.

8. The system of claim 1, wherein, for at least one given design element of the design elements, the system is configured to convert edges of the given design element into rounded edges, wherein a curvature of the rounded edges is selected based on one or more dimensions of the given design element.

9. The system of claim 1, configured to perform at least one of (i) or (ii):

(i) perform a reduction of noise present in the inspection image, wherein said reduction depends on one or more dimensions of the structural elements of the semiconductor specimen represented in the inspection image, or (ii) perform an enhancing of edges of one or more of the structural elements of the semiconductor specimen represented in the inspection image, wherein said enhancing depends on one or more dimensions of the structural elements of the semiconductor specimen represented in the inspection image.

10. The system of claim 1, configured to detect presence of one or more horizontal or vertical lines in the design image or in the design data, and use this detection to determine the registration data between the design image or the design data and the inspection image.

11. The system of claim 1, wherein the registration data comprise:

data informative of a shift of the design image or of the design data;

data informative of a deformation of one or more of the design elements.

12. The system of claim 1, configured to determine a deformation enabling a match between the design elements and the structural elements represented in the inspection image according to a matching criterion.

13. The system of claim 1, wherein a distance between adjacent points of the grid is equal to or larger than half a minimum distance between the design elements.

14. The system of claim 1, wherein:

the design image or the design data is informative of a plurality of design layers, wherein the system is configured to determine, for each given design layer of the plurality of design layers, given data comprising at least one of a shift, a deformation, or displacement parameters of one or more points of the design image or of the design data, and use the given data to transform each design layer separately in the design image or in the design data.

15. The system of claim 1, wherein the design data is informative of a plurality of design layers, wherein the system is configured to rasterize the design data of the plurality of design layers, and combine them to obtain the design image, without requiring user input for defining pixel intensity in the design image.

16. A system comprising one or more processing circuitries configured to:

obtain an inspection image of a semiconductor specimen, and a design image or design data, informative of a plurality of design elements, determine data $D_{pitch}$ informative of a periodic distance between design elements of the plurality of design elements, which are associated with a shape meeting a similarity criterion, determine a correspondence between the design image and the inspection image, for different first successive positions of the design image relative to the inspection image, wherein each position of these first successive positions differs from a previous position by a first shift value determined based on data $D_{pitch}$, to obtain a first estimate of a registered position of the design image with respect to the inspection image, determine a correspondence between the design image and the inspection image, for different second successive positions of the design image relative to the inspection image, located around said first estimate of the registered position, wherein each position of these second successive positions differs from a previous position by a second shift value, smaller than the first shift value, to obtain a second estimate of a registered position of the design image with respect to the inspection image, and transform the design image or the design data using the second estimate.

17. The system of claim 16, wherein the design image or the design data is informative of a plurality of design layers, wherein the system is configured to determine, for each given design layer of the plurality of design layers, given data comprising at least one of a shift, a deformation, or displacement parameters of one or more points of the design image, and use the given data to transform each design layer separately in the design image or in the design data.

18. The system of claim 16, configured to:

determine a grid of points in the design image or in the design data, determine displacement parameters of one or more points of the grid, in order to match at least partially the inspection image, wherein at least two points are assigned with different displacement parameters.

19. A non-transitory computer readable medium comprising instructions that, when executed by one or more processors, cause the one or more processor to perform:

obtaining an inspection image of a semiconductor specimen, and a design image or design data, informative of a plurality of design elements, determining data $D_{pitch}$ informative of a periodic distance between design elements of the plurality of design elements, which are associated with a shape meeting a similarity criterion, and using the data $D_{pitch}$ to obtain registration data between the design image or the design data, and the inspection image, determining a grid of points in the design image, and determining displacement parameters of a plurality of points of the grid, in order to match at least partially the inspection image, wherein at least two points of the grid are associated with different displacement parameters, wherein the registration data and the displacement parameters characterize a transformation between the design image or the design data and the inspection image, the transformation being indicative of deviations between structural elements of the semiconductor specimen represented in the inspection image and corresponding design elements of the design image or design data.

* * * * *